United States Patent
Lents et al.

(10) Patent No.: US 11,939,925 B2
(45) Date of Patent: Mar. 26, 2024

(54) DESCENT OPERATION FOR AN AIRCRAFT PARALLEL HYBRID GAS TURBINE ENGINE PROPULSION SYSTEM

(71) Applicant: Raytheon Technologies Corporation, Farmington, CT (US)

(72) Inventors: Charles E. Lents, Amston, CT (US); Joseph B. Staubach, Colchester, CT (US); Larry W. Hardin, East Hartford, CT (US); Jonathan Rheaume, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/840,715

(22) Filed: Jun. 15, 2022

(65) Prior Publication Data
US 2022/0349351 A1 Nov. 3, 2022

Related U.S. Application Data

(62) Division of application No. 15/200,149, filed on Jul. 1, 2016, now Pat. No. 11,428,170.

(51) Int. Cl.
*F02C 7/36* (2006.01)
*B64D 27/10* (2006.01)
(Continued)

(52) U.S. Cl.
CPC ............... *F02C 7/36* (2013.01); *B64D 27/10* (2013.01); *B64D 27/24* (2013.01); *B64D 31/06* (2013.01);
(Continued)

(58) Field of Classification Search
CPC .... F02K 3/06; F02K 5/00; F02C 7/268; F02C 7/275; F02C 7/32; F02C 7/36; F02C 6/14;
(Continued)

(56) References Cited

U.S. PATENT DOCUMENTS 4,245,462 A * 1/1981 McCombs, Jr. ........ F02C 7/262
60/790
4,517,796 A 5/1985 McCombs, Jr.
(Continued)

*Primary Examiner* — Todd E Manahan
*Assistant Examiner* — Kyle Robert Thomas
(74) *Attorney, Agent, or Firm* — Carlson, Gaskey & Olds, P.C.

(57) ABSTRACT

A gas turbine engine includes a core having a compressor section with a first compressor and a second compressor, a turbine section with a first turbine and a second turbine, and a primary flowpath fluidly connecting the compressor section and the turbine section. The first compressor is connected to the first turbine via a first shaft, the second compressor is connected to the second turbine via a second shaft, and a motor is connected to the first shaft such that rotational energy generated by the motor is translated to the first shaft. The gas turbine engine includes a takeoff mode of operation, a top of climb mode of operation, and at least one additional mode of operation. The gas turbine engine is undersized relative to a thrust requirement in at least one of the takeoff mode of operation and the top of climb mode of operation, and a controller is configured to control the mode of operation of the gas turbine engine.

16 Claims, 1 Drawing Sheet

(51) Int. Cl.
  *B64D 27/24* (2006.01)
  *B64D 31/06* (2006.01)
  *F01D 15/10* (2006.01)
  *F02C 6/14* (2006.01)
  *F02C 9/50* (2006.01)
  *B64D 27/02* (2006.01)

(52) U.S. Cl.
  CPC .............. *F01D 15/10* (2013.01); *F02C 6/14* (2013.01); *F02C 9/50* (2013.01); *B64D 2027/026* (2013.01); *F05D 2220/76* (2013.01); *Y10S 903/905* (2013.01); *Y10S 903/906* (2013.01)

(58) Field of Classification Search
  CPC ...... F02C 9/48; F02C 9/50; F02C 9/54; F01D 15/10
  See application file for complete search history.

(56) References Cited

U.S. PATENT DOCUMENTS

| | | | |
|---|---|---|---|
| 5,899,411 A | | 5/1999 | Latos et al. |
| 6,848,259 B2* | | 2/2005 | Kelller-Sornig ........ F02C 7/08 |
| | | | 60/39.15 |
| 7,117,683 B2 | | 10/2006 | Thompson |
| 7,380,749 B2 | | 6/2008 | Fucke et al. |
| 7,882,691 B2 | | 2/2011 | Lemmers, Jr. et al. |
| 7,997,085 B2 | | 8/2011 | Moniz et al. |
| 8,549,833 B2* | | 10/2013 | Hyde ...................... F02C 6/18 |
| | | | 60/204 |
| 8,640,439 B2 | | 2/2014 | Hoffjann et al. |
| 8,727,270 B2 | | 5/2014 | Burns et al. |
| 2006/0102790 A1 | | 5/2006 | Atkey et al. |
| 2006/0174629 A1* | | 8/2006 | Michalko ................. F02C 9/00 |
| | | | 60/774 |
| 2006/0228206 A1* | | 10/2006 | Decker ................... F01D 5/141 |
| | | | 415/1 |
| 2006/0260323 A1 | | 11/2006 | Moulebhar |
| 2007/0151258 A1 | | 7/2007 | Gaines et al. |
| 2008/0070078 A1 | | 3/2008 | Gummalla et al. |
| 2009/0113896 A1 | | 5/2009 | Fukuda |
| 2009/0293494 A1 | | 12/2009 | Hoffjann et al. |
| 2012/0138737 A1 | | 6/2012 | Bruno et al. |
| 2014/0145008 A1 | | 5/2014 | Webster |
| 2014/0245748 A1 | | 9/2014 | Anghel et al. |
| 2014/0331686 A1* | | 11/2014 | Gulen .................... F01K 23/10 |
| | | | 60/39.182 |
| 2015/0151847 A1 | | 6/2015 | Krug et al. |

\* cited by examiner

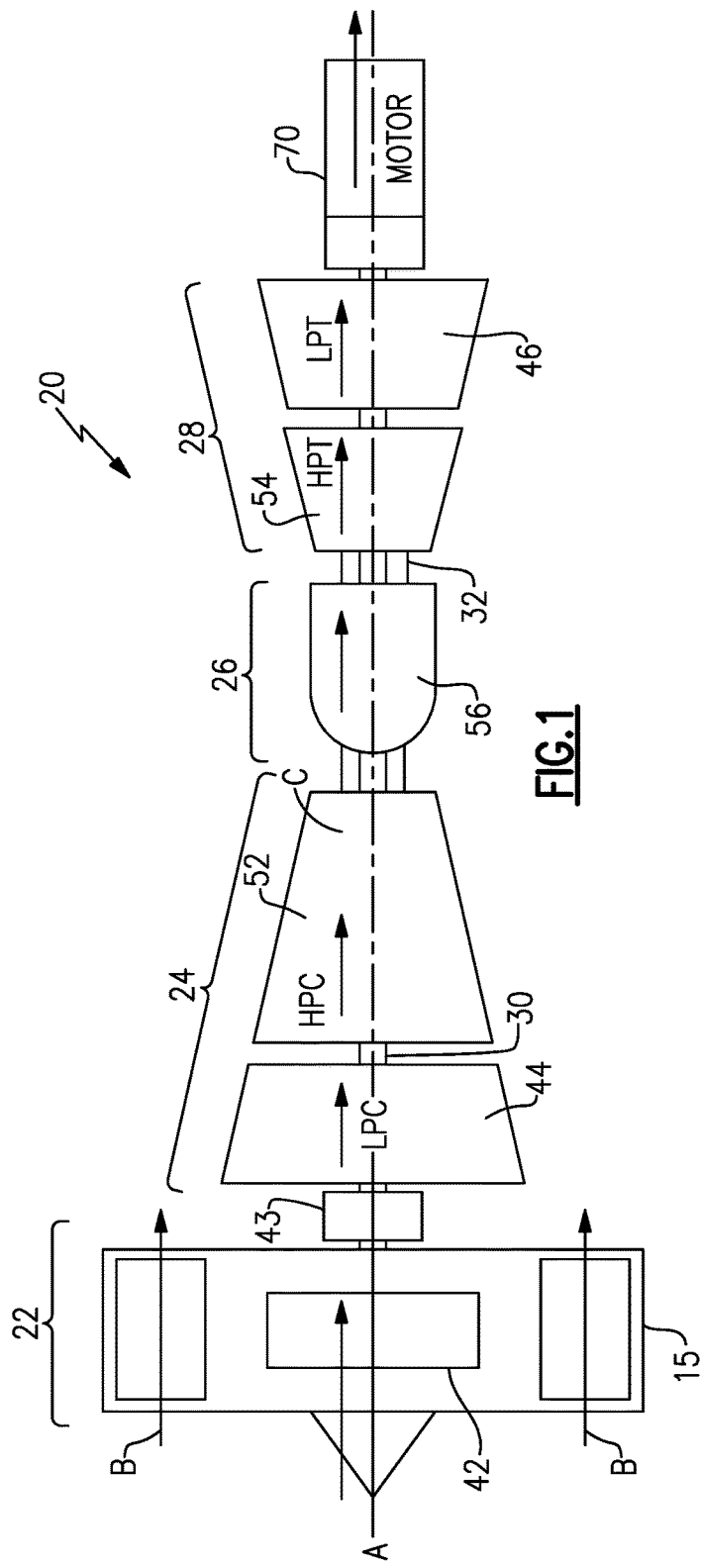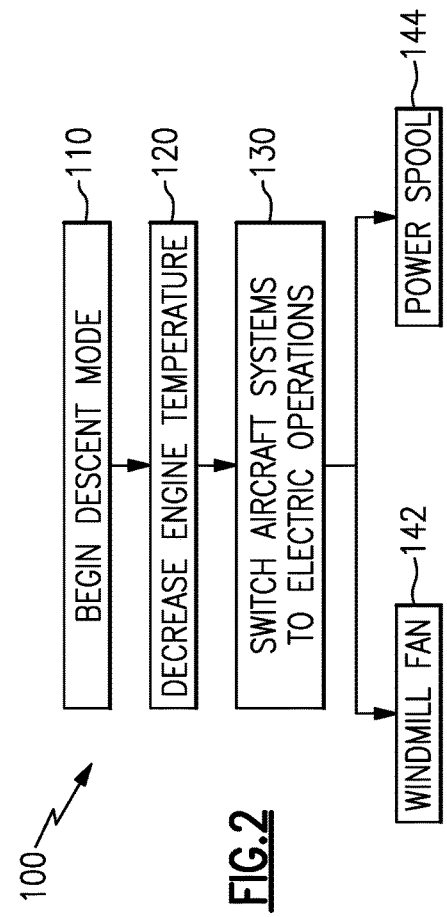
FIG.1
FIG.2

DESCENT OPERATION FOR AN AIRCRAFT PARALLEL HYBRID GAS TURBINE ENGINE PROPULSION SYSTEM

CROSS-REFERENCE TO RELATED APPLICATION

This application is a divisional of U.S. Non-Provisional patent application Ser. No. 15/200,149 filed on Jul. 1, 2016.

STATEMENT REGARDING FEDERALLY SPONSORED RESEARCH OR DEVELOPMENT

This application was made with government support under Contract No. NNC14CA32C awarded by NASA. The government has certain rights in this invention.

TECHNICAL FIELD

The present disclosure relates generally to hybrid gas turbine electric engines, and more specifically to a method and apparatus for operating a hybrid gas turbine electric propulsion system during descent.

BACKGROUND

Gas turbine engines compress air in a compressor section, combine the compressed air with a fuel, ignite the mixture in a combustor section, and expand the resultant combustion products across a turbine section. The expansion of the combustion products drives the turbine section to rotate. The turbine section is connected to the compressor section via one or more shafts, and the rotation of the turbine section drives the rotation of the compressor section. In turbofan gas turbine engines, a fan is similarly connected to a shaft, and driven to rotate by the turbine section. In a geared turbofan, there is a gear set driven by the shaft allowing the fan to rotate at a different (slower) speed than the shaft.

Typical gas turbine engines are designed such that the peak operational efficiency occurs when the engine is operated during one or both of takeoff or top of climb (alternately referred to as climb out) conditions. During these conditions, the gas turbine engine requires the maximum amounts of thrust output. The efficiency designs impact the size of the engine components, and the temperatures at which the engine components run during each phase of engine operation. By way of example, during cruise operation, an aircraft requires less thrust, and the gas turbine engine is operated at cooler temperatures. Since the typical gas turbine engine is designed for peak efficiency during takeoff or top of climb, where the turbine inlet temperature is at its maximum allowable limit for best efficiency and highest thrust, and the gas turbine engine is operated at a lower efficiency during other modes, such as cruise, where the turbine inlet temperature is below the maximum allowable limit.

SUMMARY OF THE INVENTION

In one exemplary embodiment a gas turbine engine includes a core including a compressor section having a first compressor and a second compressor, a turbine section having a first turbine and a second turbine, and a primary flowpath fluidly connecting the compressor section and the turbine section. The first compressor is connected to the first turbine via a first shaft, the second compressor is connected to the second turbine via a second shaft, a motor connected to the first shaft such that rotational energy generated by the motor is translated to the first shaft, wherein the gas turbine engine includes a takeoff mode of operation, a top of climb mode of operation, and at least one additional mode of operation, and wherein the gas turbine engine is undersized relative to a thrust requirement in at least one of the takeoff mode of operation and the top of climb mode of operation, and a controller configured to control the mode of operation of the gas turbine engine.

In another example of the above described gas turbine engine the at least one additional mode of operation includes a descent mode of operation.

In another example of any of the above described gas turbine engines an air pressure from at least one compressor bleed is replaced by air pressure from an electric compressor during the descent mode of operation.

In another example of any of the above described gas turbine engines the electric compressor is electrically coupled to an energy storage system, and wherein the energy storage system stores energy generated by the motor during the at least one additional mode of operation.

Another example of any of the above described gas turbine engines further includes the controller being configured to control the engine such that a fan windmills during the descent mode of operation, wherein the fan is interconnected with the first shaft via a gear system such that rotation of the fan is translated to the first shaft.

In another example of any of the above described gas turbine engines the motor is configured as a motor during the descent mode of operation, and wherein an energy storage device provides operational power to the motor during the descent mode of operation.

In another example of any of the above described gas turbine engines the controller is configured to cause the motor to generate an amount of power approximately equal to an amount of power required to overcome the engine drag during the descent mode of operation.

In another example of any of the above described gas turbine engines the controller is configured to prevent the core from operating during the descent mode of operation.

Another example of any of the above described gas turbine engines further includes a fan section forward of the first compressor, the fan section including a fan connected to the first shaft via a geared architecture.

In another example of any of the above described gas turbine engines the at least one additional mode of operation includes a cruise mode of operation and a geometry of the gas turbine engine is physically sized such that a turbine inlet temperature of the second turbine is at a maximum while the engine is in the cruise mode of operation.

In another example of any of the above described gas turbine engines the at least one additional mode of operation includes a cruise mode of operation and a flow rate through the gas turbine engine is configured to be controlled by a controller such that a turbine inlet temperature of the second turbine is at a maximum while the engine is in the cruise mode of operation.

An exemplary method for operating a gas turbine engine includes generating thrust at least in part by operating a gas turbine engine core at a maximum temperature during a first mode of operation, and generating no thrust from the gas turbine engine core in a descent mode of operation.

In another example of the above described method for operating a gas turbine engine generating no thrust from the gas turbine engine comprises preventing a gas turbine engine core from operating.

In another example of any of the above described methods for operating a gas turbine engine preventing the core from operating comprises at least limiting provision of air to the core.

In another example of any of the above described methods for operating a gas turbine engine preventing the core from operating comprises at least limiting a provision of fuel to the core.

In another example of any of the above described methods for operating a gas turbine engine generating no thrust from the gas turbine engine comprises operating a gas turbine engine core at a minimum temperature required to prevent a thermal cycle of the gas turbine engine from occurring.

Another example of any of the above described methods for operating a gas turbine engine further includes allowing a fan to windmill during the descent mode of operation, and wherein the windmilling of the fan drives rotation of an electric motor, thereby generating electricity.

Another example of any of the above described methods for operating a gas turbine engine further includes at least partially powering at least one aircraft system using the generated electricity.

Another example of any of the above described methods for operating a gas turbine engine further includes storing at least a portion of the generated electricity in an energy storage device.

These and other features of the present invention can be best understood from the following specification and drawings, the following of which is a brief description.

BRIEF DESCRIPTION OF THE DRAWINGS

FIG. 1 schematically illustrates an exemplary gas turbine engine according to one embodiment.

FIG. 2 illustrates a method of operating the exemplary gas turbine engine of FIG. 1 during descent.

DETAILED DESCRIPTION OF AN EMBODIMENT

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures and geared turbofan architectures.

The exemplary engine 20 generally includes a low speed spool 30 and a high speed spool 32 mounted for rotation about an engine central longitudinal axis A relative to an engine static structure via several bearing systems. It should be understood that various bearing systems at various locations may be provided.

The low speed spool 30 generally includes an inner shaft that interconnects a fan 42, a first (or low) pressure compressor 44 and a first (or low) pressure turbine 46. The inner shaft is connected to the fan 42 through a speed change mechanism (such as a gear system 43), which in the exemplary gas turbine engine 20 is illustrated as a geared architecture to drive the fan 42 at a lower speed than the low speed spool 30. The high speed spool 32 includes an outer shaft that interconnects a second (or high) pressure compressor 52 and a second (or high) pressure turbine 54. A combustor 56 is arranged in the exemplary gas turbine 20 between the high pressure compressor 52 and the high pressure turbine 54. In some examples, a mid-turbine frame of the engine static structure is arranged generally between the high pressure turbine 54 and the low pressure turbine 46. The mid-turbine frame further supports bearing systems within the turbine section 28. The inner shaft and the outer shaft are concentric and rotate via bearing systems about the engine central longitudinal axis A, which is collinear with the longitudinal axes of the inner shaft and the outer shaft.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 43 may be varied. For example, gear system 43 may be located aft of combustor section 26 or even aft of turbine section 28, and fan section 22 may be positioned forward or aft of the location of gear system 43.

The engine 20 in one example is a high-bypass geared aircraft engine. In a further example, the engine 20 bypass ratio is greater than about six (6), with an example embodiment being greater than about ten (10), the geared architecture 43 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The gear system 43 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

In some examples, an electric motor 70 is incorporated into the engine 20 and is capable of generating rotational power using electricity provided by an electric energy source. In some examples, a motor/generator can be utilized as the motor 70 and electric energy can be generated by rotational energy from the low speed spool 30. In such an example, the electric energy can be provided to a power distribution system, or otherwise stored.

Further, the presence of the electric motor 70 allows the engine 20 to be undersized relative to the thrust requirements during a takeoff operation and/or a climb out operation. In such an example, a geometry of the engine 20 can be physically sized such that a turbine inlet temperature of the high pressure turbine 54 is at the maximum allowable temperature for climb while engine 20 is at the maximum thrust cruise condition. Alternatively, a flow rate through the engine 20 can configured to be controlled by a controller such that a turbine inlet temperature of the high pressure turbine 54 is at a maximum while the engine 20 is in the cruise mode of operation.

While illustrated in the example of FIG. 1 as being positioned aft of the low pressure turbine 46, one of skill in the art, having the benefit of this disclosure, will understand that the motor 70 can be placed at alternative axial positions within the gas turbine engine 20, and provide similar functions.

Gas turbine engines operate over a large range of part to full power settings with each part to full power setting having a different fuel efficiency. The part to full power settings are alternately referred to as modes of operation. The efficiency during low power modes of operation of the gas turbine engine 20 is much lower than the efficiency of the gas turbine engine during maximum power modes of operation. By way of example, one operational mode during which the engine 20 operates at a low power is while the aircraft is descending. This mode is referred to as a descent mode of operation.

During the descent mode of operation, aircraft engines are typically operated at above a minimum idle temperature in order to allow the engine 20 to generate sufficient pressure for provision to the on-board environmental control system for cabin cooling and pressurization. Operation of the engine to perform these functions results in an expenditure of fuel for operations unrelated to aircraft flight. Further, in some examples, aircraft engines are operated at a minimum temperature in order to prevent thermally cycling the engine even when thrust from the engine is not needed for proper aircraft operation. Some engine components are life limited to a number of thermal cycles, and increasing a number of thermal cycles in a single flight decreases the life span of those components. By maintaining the engine 20 at the minimum temperature, thermal cycling of the engine is prevented.

In the exemplary engine 20 of FIG. 1, the motor 70 is configured to generate electric power during at least one mode of engine operation. By way of example, the generator can be configured to generate electricity during the cruise mode of operation. The energy generated during this mode can be stored in an energy storage system, such as a battery, supercapacitor, or the like, and utilized in later engine operations where the engine is either turned off, or is operating at insufficient levels to operate environmental, and similar aircraft systems. In this example, the generated electricity can be used to power supplemental components, such as an electric air compressor, to operate aircraft systems while the engine 20 is providing insufficient bleed air to operate the aircraft systems.

With reference again to the engine 20 illustrated in FIG. 1, the compressor section 24, the combustor section 26 and the turbine section 28 form what is referred to as the engine core. The primary flowpath C flows through the engine core, and provides the necessary air for engine operations. During a descent mode of operation, or other low power modes, such as when the aircraft including the turbine engine 20 is undergoing taxi procedures, the core section is turned off. In alternative examples, the core section can be maintained at a minimum fuel burn to maintain the engine temperature at the thermal cycle threshold, thereby preventing an additional thermal cycle should the core need to be utilized again prior to landing. By not operating the core to generate high energy air for driving the low pressure turbine only at low thrust conditions, the overall fuel burn and emissions of the aircraft during any given flight are reduced.

Further, by using electric energy generated by the motor 70 to power aircraft systems, such as environmental control systems, the operation of the aircraft systems can be decoupled from the operation of the engine 20 during at least some modes of operation.

With continued reference to FIG. 1, one exemplary low power mode of operation is a descent mode of operation, during which the aircraft is descending from cruise altitude to a lower altitude and/or landing. As described above, while operating in the descent mode of operation, aircraft systems can be powered using electricity generated by the motor 70 and stored during previous modes of operation. As aircraft positive thrust is not required during the descent mode of operation, the fan 42 is, in some examples, allowed to rotate due to air passing through the fan section 22 during the descent. This process is referred to as windmilling, and drives rotation of the low speed spool 30. Rotation of the low speed spool 30 rotates the motor 70 allowing the motor 70 to operate as a generator during descent.

In practical examples, while in a decent mode of operations the core is effectively "turned off" (prevented from providing power). In some examples, the core is fully depowered and allowed to cool down. In one alternative example, the core can be isolated from ambient temperatures, such as by closing an iris or otherwise preventing air from entering the core.

While the core is effectively turned off, the low spool 30 can be operated in a windmilling mode, where the motor/generator generates electricity. Alternatively, the motor/generator, acting as a motor, can put power on the low spool 30 such that the same amount of thrust is produced as a conventional engine in descent, or such that enough thrust is generated to overcome engine drag.

With continued reference to FIG. 1, FIG. 2 illustrates a method 100 for operating a hybrid electric gas turbine engine, such as the gas turbine engine 20 of FIG. 1 during a descent mode of operation. When the aircraft begins its initial preparation for descent, an engine controller places the engine 20 into the descent mode of operation in a "begin descent mode" step 110.

As the aircraft begins to descend, the controller decreases the engine temperature in a "decrease engine temperature" step 120. The decrease in the engine temperature eliminates, or removes, the thrust provided from the engine 20. In other examples, the decrease can be achieved by reducing the flow of fuel into the combustor. In yet further examples, the temperature decrease can be achieved by a combination of the two.

In some examples, the temperature decrease limits engine operation to a minimum temperature threshold required to prevent thermal cycling. In alternative examples, the temperature decrease results in the complete shutdown of the engine, and re-starting the engine would cause a new thermal cycling. In either case, once the engine is at the decreased temperature, the engine alone no longer provides sufficient power and air pressure to operate on-board aircraft systems such as an environmental system, or any similar systems.

To facilitate continued operation of the aircraft systems, the controller switches the aircraft systems from engine power and operation to electric operation in a "switch aircraft systems to electric operation" step 130. While in the electric operation, aircraft systems that received power from the engine operation instead receive power from an energy storage component, such as a supplementary power unit. In some examples, the power stored in the energy storage component is produced by the motor 70 while the engine is operating in other modes during the flight. For some aircraft systems, such as environmental systems, the aircraft system is further adapted to operate using electric power by including an electric compressor sized to replicate and replace the compressed air provided by a bleed system, as the engine compressor bleed provides insufficient air to operate aircraft systems while in the reduced temperature mode.

Optionally, the controller can further allow the fan to windmill in a "windmill fan" step 142. In this mode, the controller allows air passing through the bypass duct to spin the fan. This spinning, in turn, spins the low speed spool 30 which spins the motor 70. The spinning of the motor 70 causes the motor 70 to generate electricity, and the generated electricity is provided to the aircraft power distribution system. In some examples, the energy provided is supplementary to the energy stored in the energy storage component. In alternative examples, the electricity generated in this mode is sufficient to power the aircraft systems, and the stored energy is only used when a load spike occurs.

Alternatively, if the stored energy component has excess stored energy, the stored energy component can drive the motor 70 to provide a minimum amount of power to the low speed spool 30 in a "power spool" step 144. By providing power to the low speed spool 30, the motor 70 rotates the fan and creates thrust. The magnitude of thrust created is dependent on the amount of power provided, and can be sufficient to produce a conventional thrust requirement during descent or sufficient to overcome the engine drag.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for operating a gas turbine engine comprising:
    generating thrust at least in part by operating a gas turbine engine core at a maximum temperature during a first mode of operation; and
    generating no thrust from said gas turbine engine core in a descent mode of operation; and
    wherein the gas turbine engine has:
    a core including a compressor section with a first compressor and a second compressor, a turbine section with a first turbine and a second turbine, and a primary flowpath fluidly connecting the compressor section and the turbine section;
    the first compressor is connected to the first turbine via a first shaft;
    the second compressor is connected to the second turbine via a second shaft;
    a motor connected to the first shaft such that rotational energy generated by the motor is translated to the first shaft;
    wherein the gas turbine engine includes a takeoff mode of operation, a top of climb mode of operation, and at least one additional mode of operation;
    a controller configured to control the mode of operation of the gas turbine engine; and wherein the at least one additional mode of operation includes a cruise mode of operation and controlling by the controller the gas turbine engine such that a turbine inlet temperature of the second turbine is at a maximum temperature for the top of climb mode of operations while said engine is in said cruise mode of operation, and wherein the maximum turbine inlet temperature corresponds to a maximum thrust output of the core and the maximum thrust output of the core is less than an aircraft thrust requirement on the gas turbine engine in at least one of the takeoff mode of operations and the top of climb mode of operations.

2. The method of claim 1, wherein generating no thrust from said gas turbine engine comprises preventing a gas turbine engine core from operating.

3. The method of claim 2, wherein preventing the core from operating comprises at least limiting provision of air to the core.

4. The method of claim 2, wherein preventing the core from operating comprises at least limiting a provision of fuel to the core.

5. The method of claim 1, wherein generating no thrust from said gas turbine engine comprises operating a gas turbine engine core at a minimum temperature required to prevent a thermal cycle of said gas turbine engine from occurring.

6. The method of claim 1, further comprising allowing a fan to windmill during said descent mode of operation, and wherein the windmilling of the fan drives rotation of an electric motor, thereby generating electricity.

7. The method of claim 6, further comprising at least partially powering at least one aircraft system using the generated electricity.

8. The method of claim 6, further comprising storing at least a portion of the generated electricity in an energy storage device.

9. A method for operating a gas turbine engine comprising:
    generating thrust at least in part by operating a gas turbine engine core at a maximum temperature during a first mode of operation;
    generating no thrust from said gas turbine engine core in a descent mode of operation; wherein the gas turbine engine has:
    a core including a compressor section with a first compressor and a second compressor, a turbine section with a first turbine and a second turbine, and a primary flowpath fluidly connecting the compressor section and the turbine section;
    the first compressor is connected to the first turbine via a first shaft;
    the second compressor is connected to the second turbine via a second shaft;
    a motor connected to the first shaft such that rotational energy generated by the motor is translated to the first shaft;
    wherein the gas turbine engine includes a takeoff mode of operation, a top of climb mode of operation, and at least one additional mode of operation;
    a controller configured to control the mode of operation of the gas turbine engine; and
    wherein the at least one additional mode of operation includes a cruise mode of operation and controlling by the controller a flow rate through the gas turbine engine such that a turbine inlet temperature of the second turbine is at a maximum while said engine is in said cruise mode of operation, and wherein the maximum turbine inlet temperature corresponds to a maximum thrust output of the core and the maximum thrust output of the core is less than an aircraft thrust requirement of the gas turbine engine in at least one of the takeoff mode of operations and the top of climb mode of operations.

10. The method of claim 9, wherein generating no thrust from said gas turbine engine comprises preventing a gas turbine engine core from operating.

11. The method of claim 10, wherein preventing the core from operating comprises at least limiting provision of air to the core.

12. The method of claim 10, wherein preventing the core from operating comprises at least limiting a provision of fuel to the core.

13. The method of claim 9, wherein generating no thrust from said gas turbine engine comprises operating a gas turbine engine core at a minimum temperature required to prevent a thermal cycle of said gas turbine engine from occurring.

14. The method of claim 9, further comprising allowing a fan to windmill during said descent mode of operation, and wherein the windmilling of the fan drives rotation of an electric motor, thereby generating electricity.

15. The method of claim 14, further comprising at least partially powering at least one aircraft system using the generated electricity.

16. The method of claim 14, further comprising storing at least a portion of the generated electricity in an energy storage device.

* * * * *